United States Patent
Goto et al.

(10) Patent No.: US 8,147,131 B2
(45) Date of Patent: Apr. 3, 2012

(54) TEMPERATURE SENSING CIRCUIT AND ELECTRONIC DEVICE USING SAME

(75) Inventors: Tomoyuki Goto, Kawasaki (JP); Shin-ichi Kubota, Minoo (JP); Koichi Yano, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 849 days.

(21) Appl. No.: 12/207,791

(22) Filed: Sep. 10, 2008

(65) Prior Publication Data

US 2009/0067471 A1 Mar. 12, 2009

(30) Foreign Application Priority Data

Sep. 10, 2007 (JP) ................................. 2007-233788

(51) Int. Cl.
*G01K 7/00* (2006.01)

(52) U.S. Cl. .......................................... 374/10; 374/170

(58) Field of Classification Search .................. 374/170, 374/172, 178, 1, 10, 44
See application file for complete search history.

(56) References Cited

U.S. PATENT DOCUMENTS

| | | | | |
|---|---|---|---|---|
| 3,942,718 | A * | 3/1976 | Palmieri | 236/78 R |
| 5,257,864 | A * | 11/1993 | Nomura | 374/163 |
| 5,282,685 | A * | 2/1994 | Koegler | 374/172 |
| 5,875,142 | A * | 2/1999 | Chevallier | 374/E7.035 |
| 6,909,271 | B2 * | 6/2005 | Sloneker et al. | 324/117 R |
| 7,021,821 | B2 * | 4/2006 | Bonne | 374/44 |
| 7,033,072 | B2 * | 4/2006 | Aota et al. | 374/178 |
| 7,149,644 | B2 * | 12/2006 | Kobayashi et al. | 702/130 |
| 7,446,560 | B2 * | 11/2008 | Balasubramanian et al. | 326/38 |
| 7,661,879 | B2 * | 2/2010 | Shin et al. | 374/178 |
| 7,837,384 | B2 * | 11/2010 | Floyd | 374/178 |
| 7,891,869 | B2 * | 2/2011 | Takeuchi | 374/178 |
| 2005/0271115 | A1 * | 12/2005 | Takeuchi | 374/1 |
| 2007/0043522 | A1 * | 2/2007 | Kobayashi et al. | 702/57 |
| 2007/0120551 | A1 * | 5/2007 | Shin et al. | 324/105 |
| 2007/0252616 | A1 * | 11/2007 | Balasubramanian et al. | 326/38 |
| 2008/0259990 | A1 * | 10/2008 | Takeuchi | 374/1 |
| 2009/0067471 | A1 * | 3/2009 | Goto et al. | 374/10 |
| 2011/0200070 | A1 * | 8/2011 | Makinwa et al. | 374/170 |

FOREIGN PATENT DOCUMENTS

| | | |
|---|---|---|
| JP | 2004-239734 | 8/2004 |
| JP | 2006-242894 | 9/2006 |

* cited by examiner

*Primary Examiner* — Yaritza Guadalupe-McCall
(74) *Attorney, Agent, or Firm* — Cooper & Dunham LLP

(57) ABSTRACT

A temperature sensing circuit that detects a given temperature includes a first differential input circuit and a second differential input circuit connected to the first differential input circuit. The first differential input circuit is configured to provide a first offset voltage with no temperature coefficient. The second differential input circuit is configured to provide a second offset voltage with a non-zero temperature coefficient. The given temperature is detected based on the first offset voltage and the second offset voltage. An electronic device using such a temperature sensing circuit is also disclosed.

14 Claims, 10 Drawing Sheets

TEMPERATURE SENSING CIRCUIT AND ELECTRONIC DEVICE USING SAME

TECHNICAL FIELD

This disclosure relates to a temperature sensing circuit, and more particularly, to a temperature sensing circuit that detects temperature based on a difference in gate work function between multiple transistors, and electronic devices, such as voltage regulators, personal computers, portable devices, and home appliances, using such a temperature sensing circuit.

DISCUSSION OF THE BACKGROUND

Temperature sensing circuits are used in various electronic devices, such as voltage regulators, personal computers, and various kinds of portable devices and home appliances, where control is performed in response to changes in ambient temperature.

FIG. 1 is a diagram illustrating an example of a conventional temperature sensing circuit.

As shown in FIG. 1, the conventional circuit includes a comparator 30, a reference voltage Vr, diodes D1 and D2, and a constant current source I1.

In the temperature sensing circuit, the constant current source I1 and the diodes D1 and D2 are connected in series between a voltage source Vdd and ground, forming a node N1 between the current source I1 and the diode D1. The comparator 30 has a non-inverting input connected to the node N1, an inverting input connected to the reference voltage Vr, and an output to provide a temperature detection signal Out.

During operation, the comparator 30 compares a voltage drop across the diodes D1 and D2 against the reference voltage Vr. The voltage Vr is generated by an appropriate source (e.g., a bandgap regulator) having a good temperature coefficient. The comparator output Out switches according to whether the voltage drop is above or below the reference voltage Vr.

The above temperature sensing circuit is designed to take advantage of the fact that the voltage drop across the series diodes D1 and D2 biased with the constant current I1 has a temperature coefficient. However, such a conventional design involves various electronic components for implementing various functions, such as pn junction diodes for the series diodes D1 and D2, a voltage regulator for the reference voltage source Vr, and other elements for the comparator 30, leading to increased size and complexity of the temperature sensing circuit.

By contrast, instead of using a voltage drop across coupled diodes, some recent techniques provide temperature sensing capabilities through use of a difference in gate work function between metal-oxide-semiconductor field-effect transistors (MOSFETs) with a controlled temperature coefficient.

FIG. 2 is a block diagram schematically illustrating an example of such a temperature sensing circuit.

As shown in FIG. 2, the temperature sensing circuit includes a first voltage generator 101, a second voltage generator 102, a subtractor 103, and a comparator 104.

The first voltage generator 101 generates a voltage Svptat proportional to absolute temperature (PTAT) and hence having a linear temperature coefficient either positive or negative. The second voltage generator 102 generates a first reference voltage Vref, a second reference voltage Tvref, and a third reference voltage Svref, all having no temperature coefficient.

The subtractor 103 amplifies a difference between the voltage Svptat and the third reference voltage Svref to provide an output Tvptat to the comparator 104. The comparator 104 then compares the signal Tvptat against the second reference voltage Tvref to output a temperature detection signal Tout.

In such a configuration, the second voltage generator 102 providing a voltage with no temperature coefficient operates based on a difference in gate work function between multiple FETs.

FIG. 3 is a diagram illustrating still another example of temperature sensing circuit.

As shown in FIG. 3, the temperature sensing circuit includes a first voltage generator 201, a second voltage generator 202, an impedance transformer 203, and a subtractor 204.

The first voltage generator 201 generates an output voltage VPN with a negative temperature coefficient based on a difference in gate work function between a pair of FETs.

The second voltage generator 202 generates a reference voltage VREF1 with no temperature coefficient based on a difference in gate work function between multiple FETs.

The impedance transformer 203 includes first and second operational amplifiers (op-amps) AMP1 and AMP2, and performs impedance transformation on the signals VPN and VREF1 prior to transmission to the subtractor 204.

In the impedance transformer 203, the first and second op-amps AMP1 and AMP2 each forms a voltage follower with an output connected to an inverting input. The first op-amp AMP1 receives the voltage VPN at a non-inverting input and provides a low-impedance output to one input terminal of the subtractor 204. Similarly, the second op-amp AMP2 receives the voltage VREF1 at a non-inverting input and provides a low-impedance output to another input terminal of the subtractor 204.

The subtractor 204 includes an op-amp AMP and resistors R1 through R4, and provides a temperature detection signal VOUT at an output of the op-amp AMP.

In the subtractor 204, the op-amp AMP receives the reference voltage VREF1 at a non-inverting input via the resistor R1 and the voltage VPN at an inverting input via the resistor R3, with the resistor R2 connected between the non-inverting input and ground, and the resistor R4 connected between the output and inverting input. The temperature detection signal VOUT is generated through subtraction between the input voltages VREF1 and VPN.

In such a configuration, a voltage VREF1-VPN obtained by subtracting the negative-temperature-coefficient voltage VPN from the no-temperature-coefficient voltage VREF1 has a positive temperature coefficient. Thus, the detection signal VOUT obtained by amplifying VRFF1-VPN also has a positive temperature coefficient greater than that of the difference voltage VRFF1-VPN, which provides good detection accuracy and low energy consumption of the temperature sensing circuit.

Although providing temperature sensing capabilities without using diodes, the MOSFET-based approaches illustrated in FIGS. 2 and 3 do not provide a satisfactory reduction in circuit size, since these circuits require two voltage generators, one with a temperature coefficient and the other with no temperature coefficient, in addition to a comparator for comparing the outputs of the voltage generators.

Accordingly, there remains a need for a temperature sensing circuit that provides a good temperature detection performance in a simple and compact circuit configuration. Such a circuit will contribute to a size reduction of various electronic devices incorporating temperature sensing capabilities.

BRIEF SUMMARY

This disclosure describes a novel temperature sensing circuit based on a difference in gate work function between multiple transistors.

In one aspect of the disclosure, the novel temperature sensing circuit that detects a given temperature includes a first differential input circuit and a second differential input circuit connected to the first differential input circuit. The first differential input circuit is configured to provide a first offset voltage with no temperature coefficient. The second differential input circuit is configured to provide a second offset voltage with a non-zero temperature coefficient. The given temperature is detected based on the first offset voltage and the second offset voltage.

This disclosure also describes a novel electronic device incorporating the temperature sensing circuit described above.

In one aspect of the disclosure, the novel electronic device includes a temperature sensing circuit that detects a given temperature. The temperature sensing circuit includes a first differential input circuit and a second differential input circuit connected to the first differential input circuit. The first differential input circuit is configured to provide a first offset voltage with no temperature coefficient. The second differential input circuit is configured to provide a second offset voltage with a non-zero temperature coefficient. The given temperature is detected based on the first offset voltage and the second offset voltage.

BRIEF DESCRIPTION OF THE DRAWINGS

The aforementioned and other aspects, features and advantages would be better understood by reference to the following detailed description when considered in connection with the accompanying drawings, wherein.

DETAILED DESCRIPTION OF EXEMPLARY EMBODIMENTS

Figure 1:
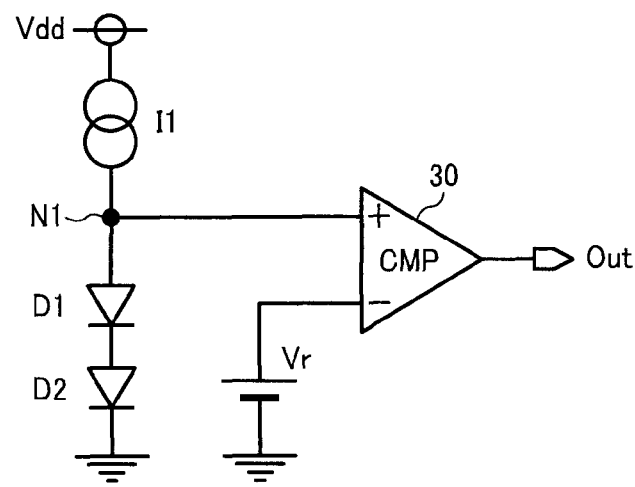
FIG. 1 is a diagram illustrating an example of a conventional temperature sensing circuit.
Figure 2:
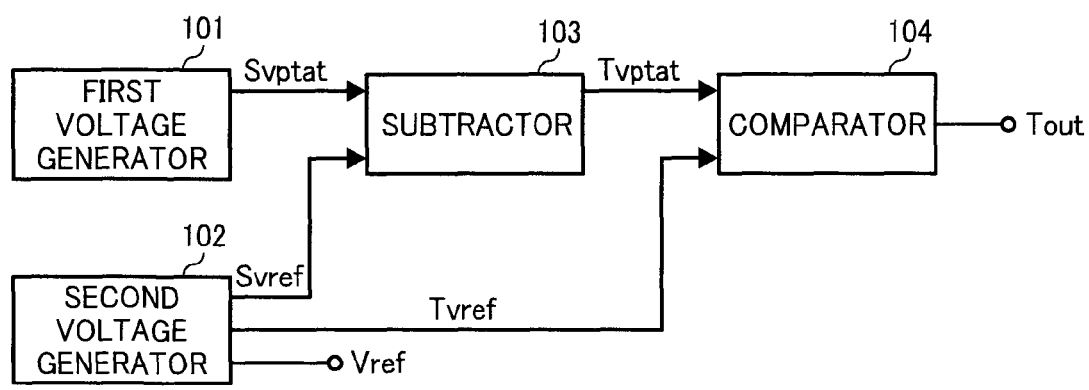
FIG. 2 is a block diagram schematically illustrating an example of another conventional temperature sensing circuit.
Figure 3:
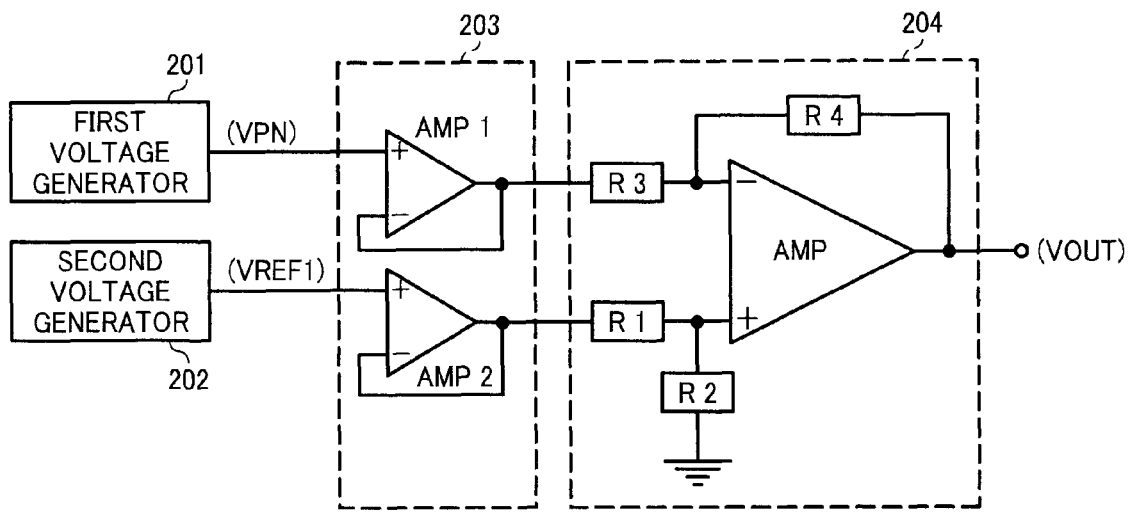
FIG. 3 is a diagram illustrating an example of still another conventional temperature sensing circuit.

In describing exemplary embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result. Referring now to the drawings, wherein like reference numerals designate identical or corresponding parts throughout the several views, examples and exemplary embodiments of this disclosure are described.

Figure 4A:
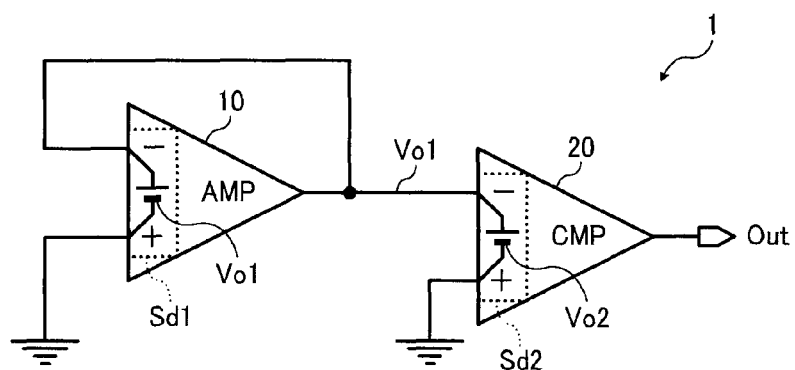
FIG. 4A is a diagram illustrating an embodiment of a temperature sensing circuit according to this patent specification.

FIG. 4A is a diagram illustrating an embodiment of a temperature sensing circuit 1 according to this patent specification.

As shown in FIG. 4A, the temperature sensing circuit 1 includes an operational amplifier or op-amp 10 and a comparator 20.

The op-amp 10 includes a first differential input circuit Sd1 in an input stage with an inverting input positive with respect to a non-inverting input. The first differential input circuit Sd1 provides a first offset voltage Vo1 having no temperature coefficient.

The op-amp 10 has an output connected to the inverting input to form a voltage follower. With the non-inverting input connected to ground, the output of the op-amp 10 is equal to the first offset voltage Vo1.

The comparator 20 includes a second differential input circuit Sd2 in an input stage with an inverting input positive with respect to a non-inverting input. The second differential input circuit Sd2 provides a second offset voltage Vo2 having a negative temperature coefficient.

The comparator 20 has the inverting input connected to the output of the op-amp 10 and the non-inverting input connected to ground. Through comparison of the inverting and non-inverting inputs, the comparator 20 outputs a temperature detection signal Out indicating when temperature reaches a given set-point Ts.

Figure 4B:
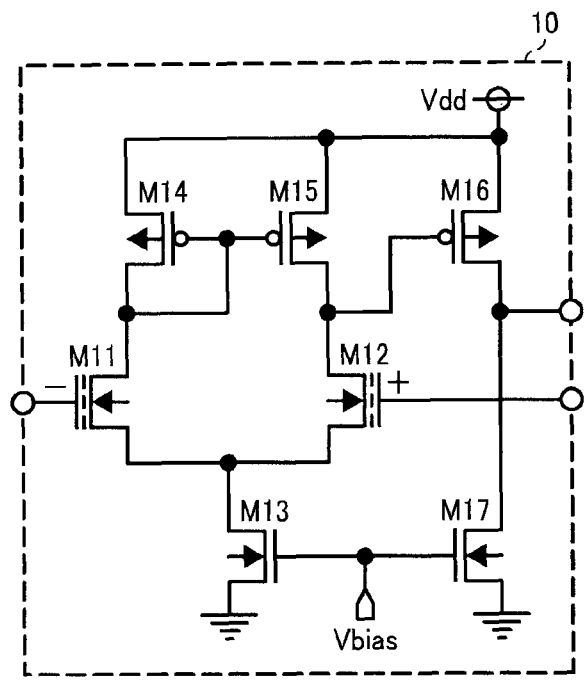
FIGS. 4B and 4C are circuit diagrams of an operational amplifier and a comparator, respectively, used in the temperature sensing circuit of FIG. 4A.
Figure 4C:
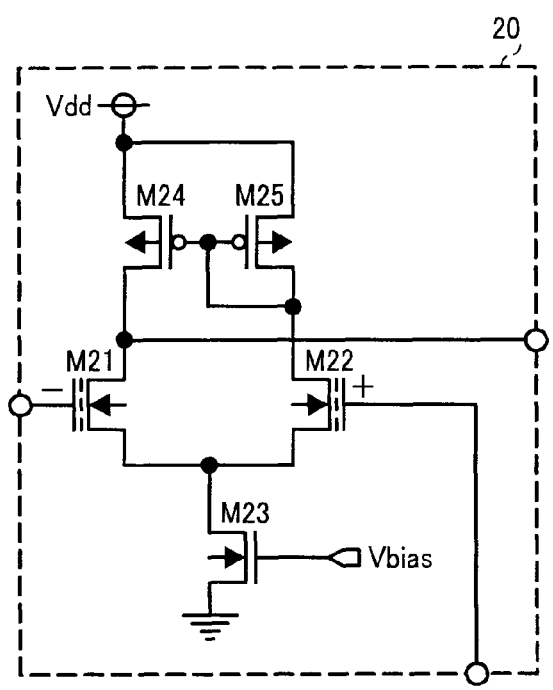

FIGS. 4B and 4C are circuit diagrams of the op-amp 10 and the comparator 20 used in the temperature sensing circuit 1 of FIG. 4A.

As shown in FIGS. 4B and 4C, the op-amp 10 and the comparator 20 both are built based on a combination of metal-oxide-semiconductor field-effect transistors (MOSFETs), a detailed description of which will be given with reference to FIG. 16.

Figure 5:
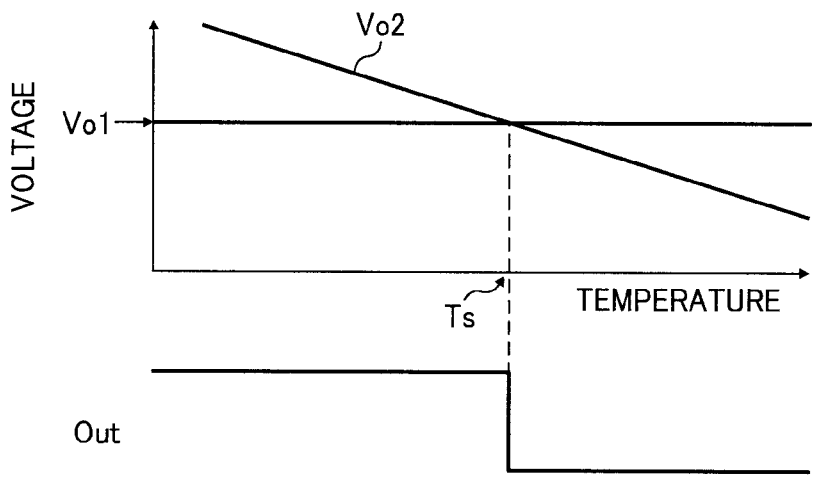
FIG. 5 shows voltage plotted against temperature, illustrating operation of the temperature sensing circuit of FIG. 4A.

FIG. 5 shows the voltages Vo1 and Vo2 plotted against temperature, illustrating operation of the temperature sensing circuit 1 of FIG. 4A near the set temperature Ts.

As shown in FIG. 5, the first offset voltage Vo1 or the output of the op-amp 10 does not vary with temperature due to having no temperature coefficient, while the second offset voltage Vo2 or the input stage voltage of the comparator 20 decreases with increasing temperature due to having a negative temperature coefficient.

Specifically, the voltage Vo2 remains higher than the voltage Vo1 at temperatures below the set-point Ts, matches Vo1 at the set-point Ts, and falls below Vo1 when temperature exceeds the set-point Ts.

Thus, the temperature detection signal Out output by the comparator 20, which is high for Vo2>Vo1 and low for Vo2<Vo1, switches at the set-point Ts.

Figure 6:
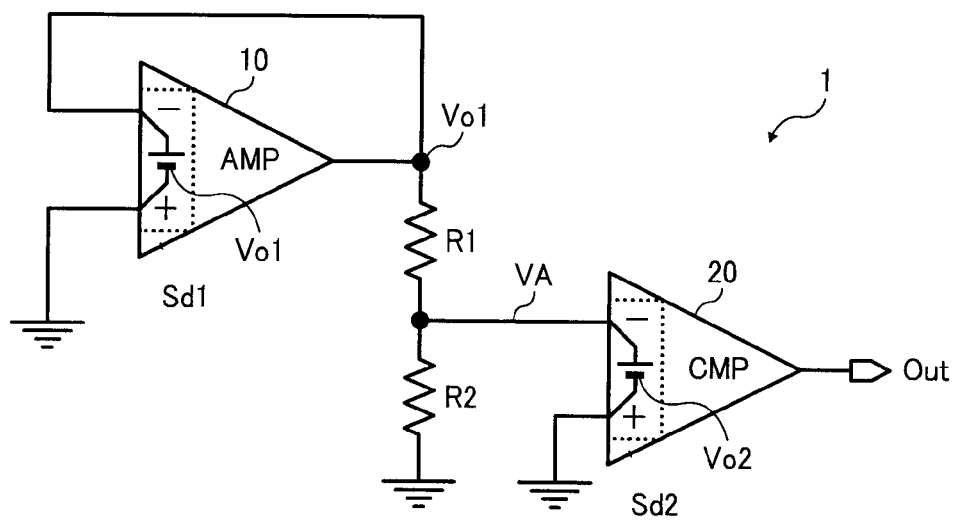
FIG. 6 is a diagram illustrating another embodiment of the temperature sensing circuit.

FIG. 6 is a diagram illustrating another embodiment of the temperature sensing circuit 1.

As shown in FIG. 6, this embodiment is similar to that depicted in FIG. 4A, except that the temperature sensing circuit 1 includes resistors R1 and R2 forming a voltage divider to divide the op-amp output Vo1 so that the comparator 20 receives a scaled voltage VA at the inverting input.

Figure 7:
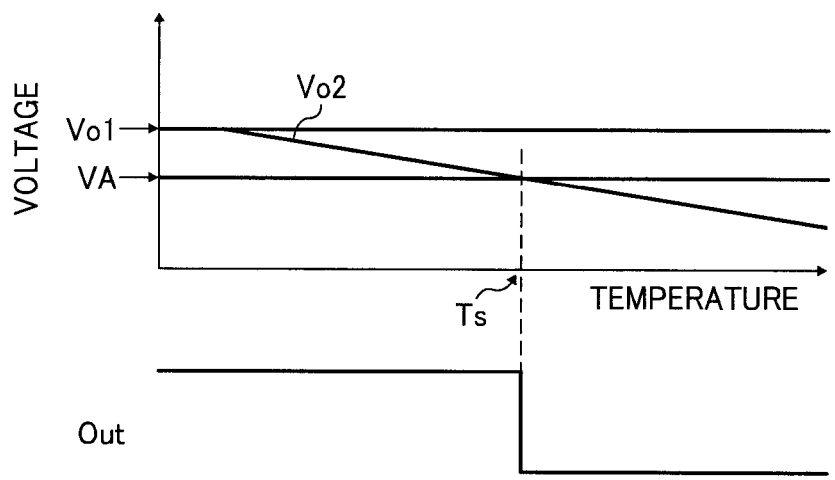
FIG. 7 shows voltage plotted against temperature, illustrating operation of the temperature sensing circuit of FIG. 6.

FIG. 7 shows the voltages Vo1, Vo2, and VA plotted against temperature, illustrating operation of the temperature sensing circuit 1 of FIG. 6 near the set temperature Ts.

As shown in FIG. 7, the inverting input VA of the comparator, obtained from the temperature-independent voltage Vo1, does not vary with temperature, while the temperature-dependent voltage Vo2 decreases with increasing temperature. The temperature detection signal Out output by the comparator 20 is high for Vo2>VA and low for Vo2<VA, switching at the set-point Ts.

Figure 8:
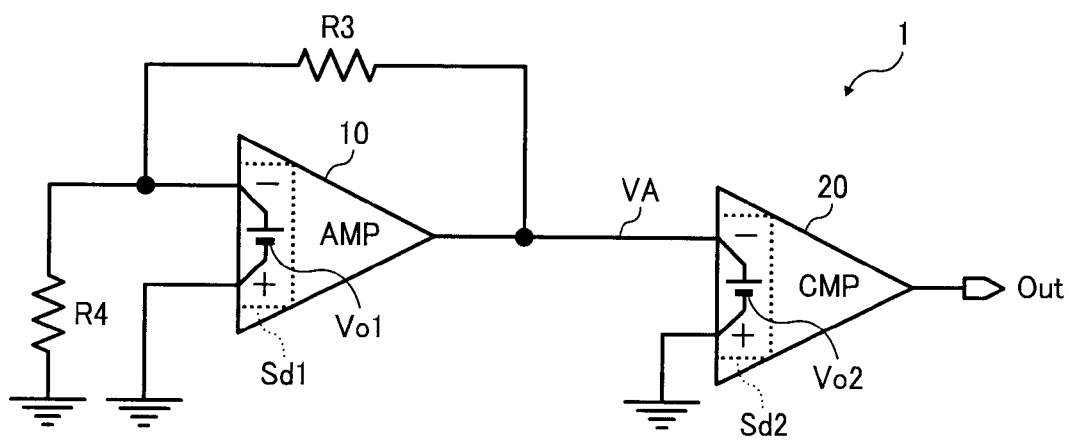
FIG. 8 is a diagram illustrating still another embodiment of the temperature sensing circuit.

FIG. 8 is a diagram illustrating still another embodiment of the temperature sensing circuit 1.

As shown in FIG. 8, this embodiment is similar to that depicted in FIG. 4A, except that the op-amp 10 is provided with a resistor R3 interposed between its inverting input and output and a resistor R4 between its inverting input and ground, so as to have a gain of 1+R3/R4 instead of forming a voltage follower.

Figure 9:
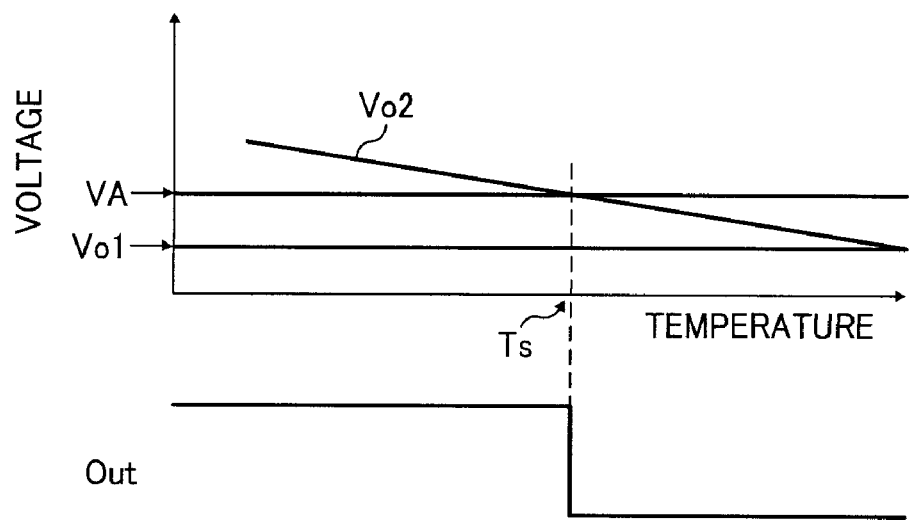
FIG. 9 shows voltage plotted against temperature, illustrating operation of the temperature sensing circuit of FIG. 8.

FIG. 9 shows the voltages Vo1, Vo2, and VA plotted against temperature, illustrating operation of the temperature sensing circuit 1 of FIG. 8 near the set temperature Ts.

As shown in FIG. 9, the inverting input VA of the comparator, obtained from the temperature-independent voltage Vo1, does not vary with temperature, while the temperature-dependent voltage Vo2 decreases with increasing temperature. The temperature detection signal Out output by the comparator 20 is high for Vo2>VA and low for Vo2<VA, switching at the set-point Ts.

Figure 10:
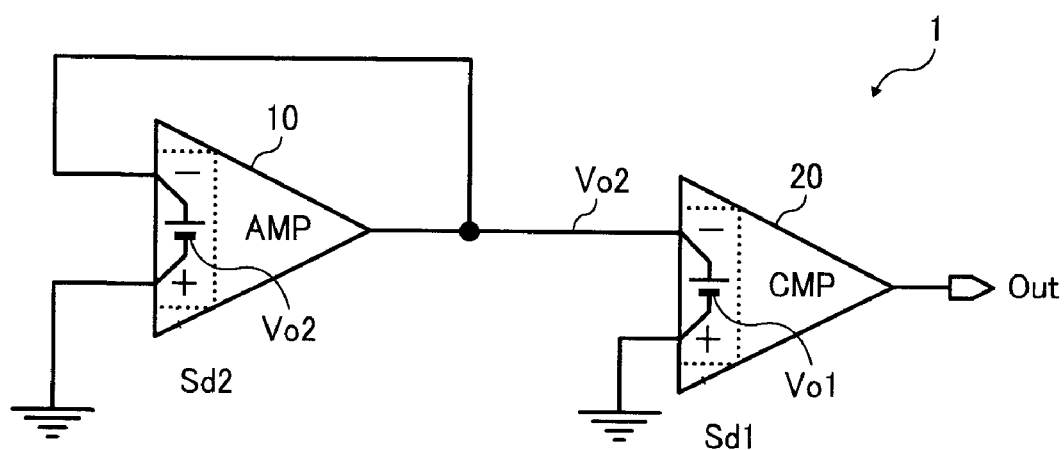
FIG. 10 is a diagram illustrating still another embodiment of the temperature sensing circuit.

FIG. 10 is a diagram illustrating still another embodiment of the temperature sensing circuit 1.

As shown in FIG. 10, this embodiment is similar to that depicted in FIG. 4A, except that the second differential input circuit Sd2 with temperature coefficient is included in the input stage of the op-amp 10, and the first differential input circuit Sd1 with no temperature coefficient is included in the input stage of the comparator 20.

Figure 11:
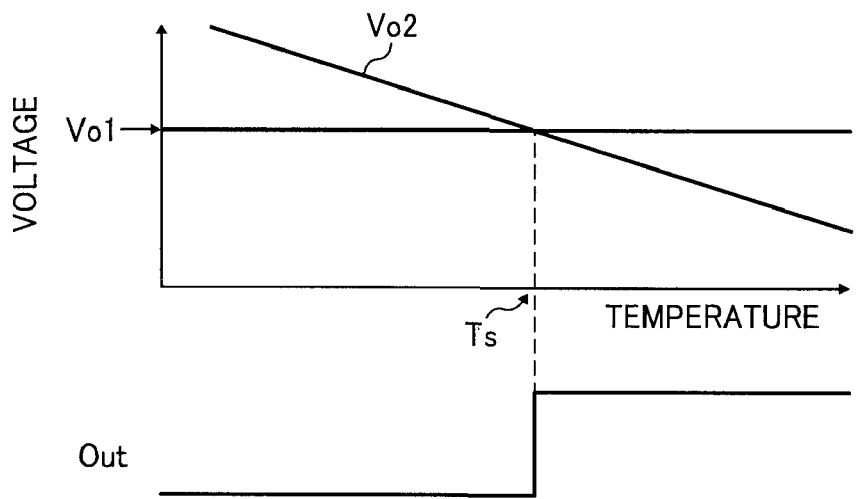
FIG. 11 shows voltage plotted against temperature, illustrating operation of the temperature sensing circuit of FIG. 10.

FIG. 11 shows the voltages Vo1, Vo2, and VA plotted against temperature, illustrating operation of the temperature sensing circuit 1 of FIG. 10 near the set temperature Ts.

As shown in FIG. 11, the first offset voltage Vo1 or the input stage voltage of the comparator 20 does not vary with temperature due to having no temperature coefficient, while the second offset voltage Vo2 or the output of the op-amp 10 decreases with increasing temperature due to having a negative temperature coefficient.

As a result, the temperature detection signal Out output by the comparator 20, which is low for Vo2>Vo1 and high for Vo2<Vo1, switches at the set-point Ts.

Figure 12:
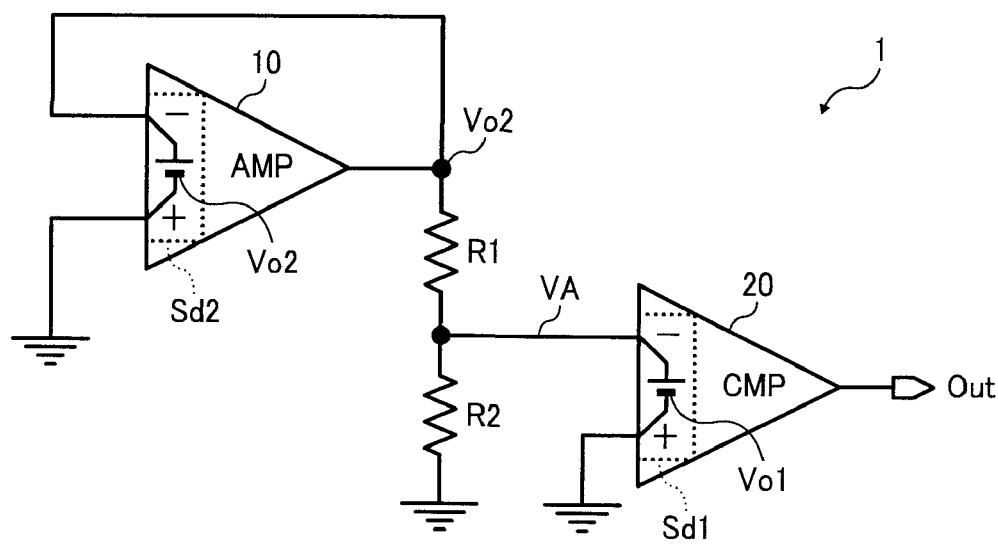
FIG. 12 is a diagram illustrating still another embodiment of the temperature sensing circuit.

FIG. 12 is a diagram illustrating another embodiment of the temperature sensing circuit 1.

As shown in FIG. 12, this embodiment is similar to that depicted in FIG. 10, except that the temperature sensing circuit 1 includes resistors R1 and R2 forming a voltage divider to divide the op-amp output Vo1 so that the comparator 20 receives a scaled voltage VA at the inverting input.

Figure 13:
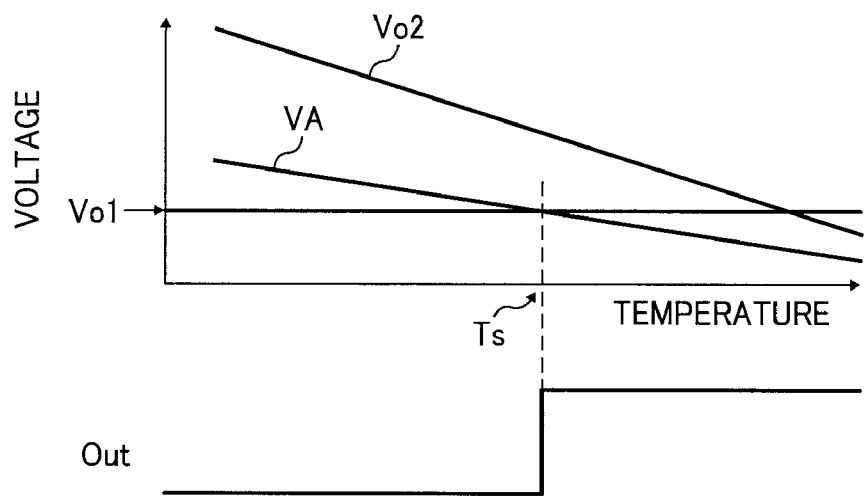
FIG. 13 shows voltage plotted against temperature, illustrating operation of the temperature sensing circuit of FIG. 12.

FIG. 13 shows the voltages Vo1, Vo2, and VA plotted against temperature, illustrating operation of the temperature sensing circuit 1 of FIG. 12 near the set temperature Ts.

As shown in FIG. 13, the inverting input VA of the comparator 20, obtained from the temperature-dependent voltage Vo2, decreases with increasing temperature, while the temperature-independent voltage Vo1 does not vary with temperature. The temperature detection signal Out output by the comparator 20 is low for VA>Vo1 and high for VA<Vo1, switching at the set-point Ts.

Figure 14:
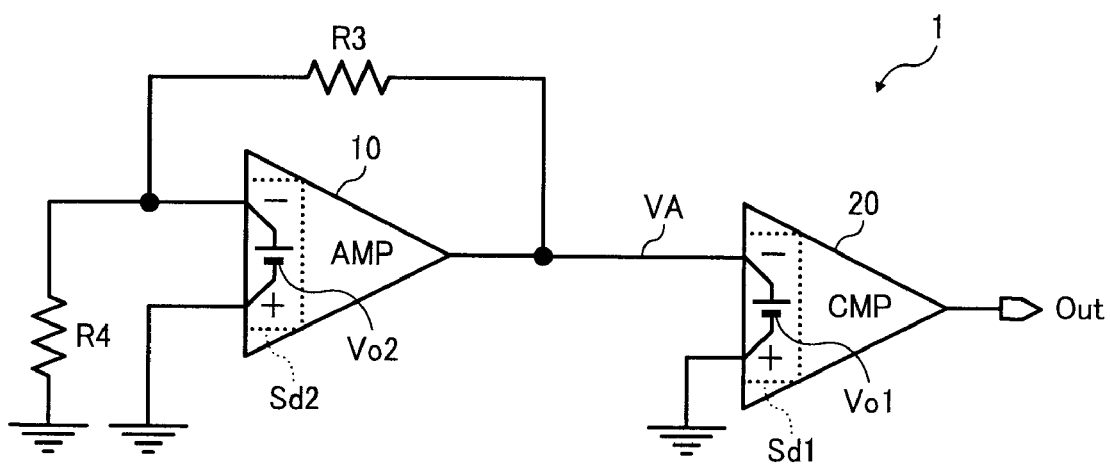
FIG. 14 is a diagram illustrating still another embodiment of the temperature sensing circuit.

FIG. 14 is a diagram illustrating still another embodiment of the temperature sensing circuit 1.

As shown in FIG. 14, this embodiment is similar to that depicted in FIG. 10, except that the op-amp 10 is provided with a resistor R3 interposed between its inverting input and output and a resistor R4 between its inverting input and ground, so as to have a gain of 1+R3/R4 instead of forming a voltage follower.

Figure 15:
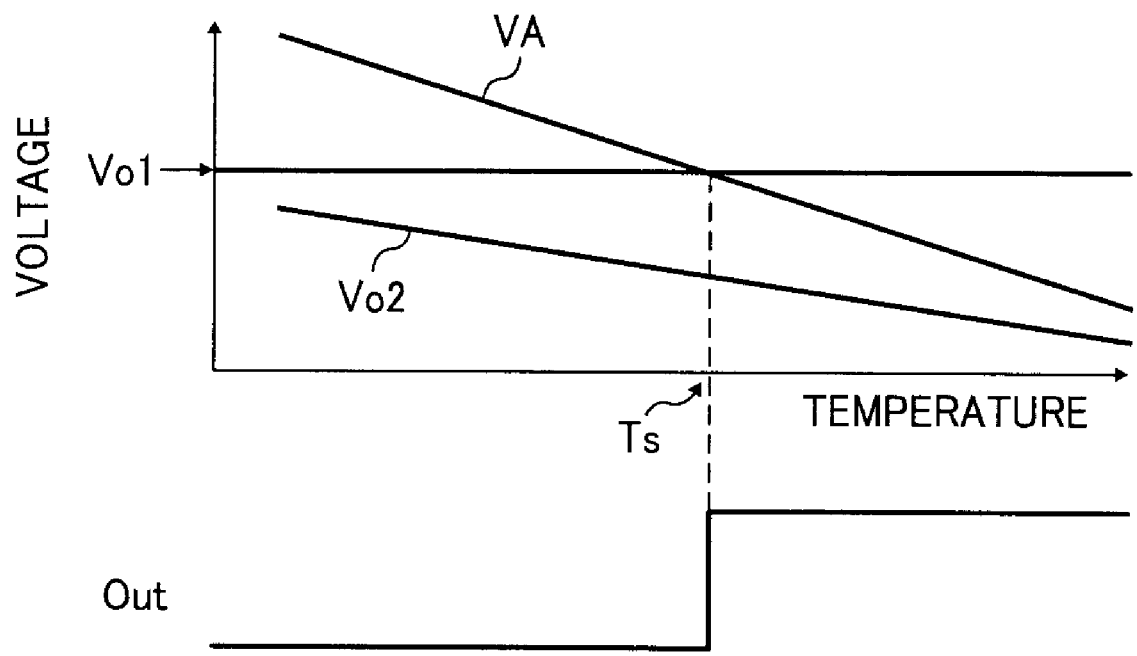
FIG. 15 shows voltage plotted against temperature, illustrating operation of the temperature sensing circuit of FIG. 14.

FIG. 15 shows the voltages Vo1, Vo2, and VA plotted against temperature, illustrating operation of the temperature sensing circuit 1 of FIG. 14 near the set temperature Ts.

As shown in FIG. 15, the inverting input VA of the comparator 20, obtained from the temperature-dependent voltage Vo2, decreases with increasing temperature, while the temperature-independent voltage Vo1 does not vary with temperature. The temperature detection signal Out output by the comparator 20 is low for VA>Vo1 and high for VA<Vo1, switching at the set-point Ts.

In the temperature sensing circuit 1 described above, the first differential input circuit Sd1 providing the offset voltage Vo1 with zero temperature coefficient and the second differential input circuit Sd2 providing the offset voltage Vo2 with temperature coefficient are included in the input stages of the op-amp 10 and the comparator 20, respectively. As the comparator 20 incorporates the capabilities of a reference voltage generator and a temperature-dependent voltage source, which are required to construct a temperature sensing circuit, a compact circuit configuration is achieved without involving complicated electronic components.

Further, the zero-temperature coefficient circuit Sd1 and the temperature-dependent circuit Sd2 each can be used as the input stage of either the op-amp 10 or the comparator 20 as shown in the illustrated embodiments, where the temperature coefficient is present in the comparator 20 and not in the op-amp 10 for the embodiments of FIGS. 4A, 6, and 8, and vice versa for the embodiments of FIGS. 10, 12, and 14. Such interchangeability of the differential input circuits Sd1 and Sd2 allows for wide variations in the design of the temperature sensing circuit 1.

Still further, the temperature sensing circuit 1 can assume various configurations of the op-amp 10, such as those having high gain or amplification, those having unity gain (i.e., the voltage follower), or those having resistors to divide the output voltage, which offers flexibility to respond to variations in the magnitude and/or temperature coefficient of the offset voltages Vo1 and Vo2.

Additionally, although the non-inverting input of the op-amp 10 and the reference input of the comparator 20 are grounded in the illustrated embodiments, these terminals may be connected to an appropriate voltage other than ground potential. In the embodiments using a pair of resistors to amplify or divide the op-amp output, i.e., the voltage divider R1 and R2 or the gain resistors R3 and R4, a higher accuracy in temperature detection may be obtained by tuning resistance of one or both of the paired resistors through trimming or the like.

Figure 16:
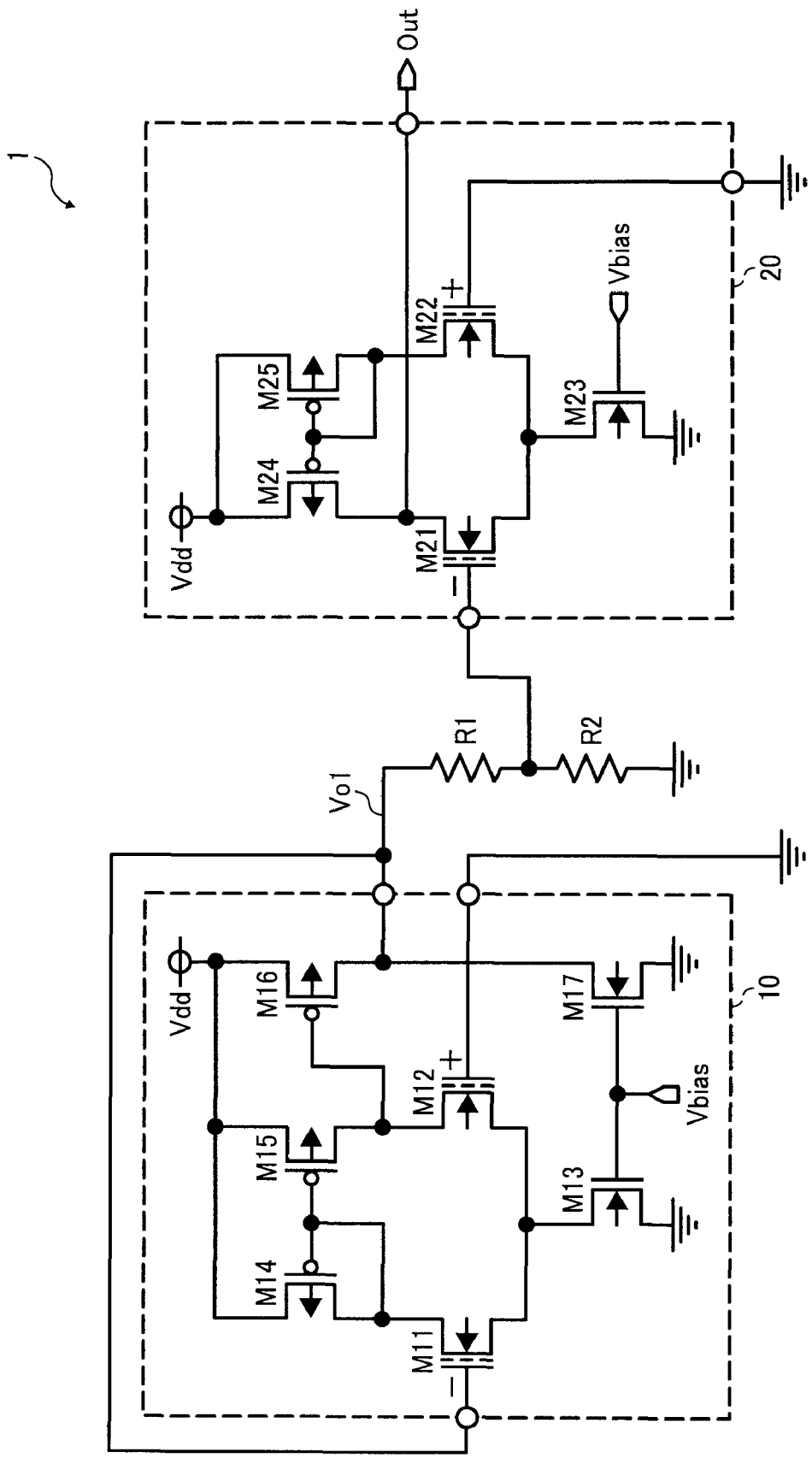
FIG. 16 is a diagram illustrating in detail the temperature sensing circuit of FIG. 6.

Referring now to FIG. 16, a diagram illustrating in detail the temperature sensing circuit 1 according to the embodiment of FIG. 6 is depicted.

As shown in FIG. 16, the op-amp 10 includes depletion-type n-channel MOS (NMOS) transistors M11 and M12, NMOS transistors M13 and M17, and p-channel MOS (PMOS) transistors M14 through M16, each having MOSFET gate, source, and drain terminals.

The depletion-type NMOS transistors M11 and M12 form the first differential input circuit Sd1 in the input stage of the op-amp 10, where the gate of the NMOS transistor M11 serves as the inverting input and the gate of the NMOS transistor M12 serves as the non-inverting input.

The sources of the input transistors M11 and M12 are connected in common to the drain of the NMOS transistor M13. The NMOS transistor M13 has its source connected to ground and its gate connected to a bias voltage Vbias.

The drain of the NMOS transistor M11 is connected to the drain of the PMOS transistor M14, and the drain of the NMOS transistor M12 is connected to the drain of the PMOS transistor M15.

The PMOS transistors M14 and M15 have their sources connected in common to a voltage source Vdd and their gates connected in common to the drain of the PMOS transistor M14 to form a current mirror, which acts as a load in the differential input circuit Sd1.

The drain of the NMOS transistor M12 is connected to the gate of the PMOS transistor M16. The PMOS transistor M16 has its source connected to the voltage source Vdd and its drain connected to the drain of the NMOS transistor 17. The NMOS transistor M17 has its source connected to ground and its gate connected to the bias voltage Vbias in common with the gate of the NMOS transistor M13.

The op-amp 10 derives an output voltage from the drain of the PMOS transistor M16. As mentioned, the op-amp 10 forms a voltage follower with the inverting input, i.e., the gate of the NMOS transistor M11, connected to the output voltage. With its non-inverting input, i.e., the gate of the NMOS transistor M12, connected to ground, the op-amp 10 provides the output voltage equal to the offset voltage Vo1 of the differential input circuit Sd1.

In such a configuration, the offset voltage Vo1 results from a difference in threshold voltage between the input transistors M11 and M12.

In general, threshold voltage of a MOS transistor may be adjusted by doping, i.e., by implanting impurities called dopants of a particular conductivity type, to change work function of the gate terminal, where a p-type doped (P+) gate has a relatively high threshold voltage and an n-type doped (N+) gate has a relatively low threshold voltage.

In the differential input circuit Sd1, the gate of the transistor M11 is doped with p-type impurities and the gate of the transistor M12 is doped with n-type impurities, so that the transistor M11 has a higher threshold voltage than that of the transistor M12. Hence, the offset voltage Vo1 is obtained with the input transistor M11 having a positive gate potential relative to that of the input transistor M12.

The temperature coefficient of the offset voltage Vo1 thus obtained is dependent on the ratio of size or gate length between the input transistors M11 and M12. In the differential input circuit Sd1, the size ratio of the transistor M11 to the transistor M12 is set to approximately 2:1 to provide the offset voltage Vo1 with zero temperature coefficient.

With further reference to FIG. 16, the output terminal of the op-amp 10 is connected to the inverting input of the comparator 20 via the voltage divider resistors R1 and R2.

The comparator 20 includes depletion-type NMOS transistors M21 and M22, an NMOS transistor M23, and PMOS transistors M24 and M25, each having MOSFET gate, source, and drain terminals.

The depletion-type NMOS transistors M21 and M22 form the second differential input circuit Sd2 in the input stage of the comparator 20, where the gate of the NMOS transistor M21 serves as the inverting input and the gate of the NMOS transistor M22 serves as the non-inverting input.

The sources of the input transistors M21 and M22 are connected in common to the drain of the NMOS transistor M23. The NMOS transistor M23 has its source connected to ground and its gate connected to a bias voltage Vbias.

The drain of the NMOS transistor M21 is connected to the drain of the PMOS transistor M24, and the drain of the NMOS transistor M22 is connected to the drain of the PMOS transistor M25.

The PMOS transistors M24 and M25 have their sources connected in common to a voltage source Vdd and their gates connected in common to the drain of the PMOS transistor M25 to form a current mirror, which acts as a load in the differential input circuit Sd2.

The comparator 20 derives the output Out from the drain of the NMOS transistor M21, which switches when the offset voltage Vo2 reaches the level of the inverting input.

In such a configuration, as in the case of the first offset voltage Vo1, the offset voltage Vo2 results from a difference in threshold voltage between the input transistors M21 and M22, obtained by creating a difference in gate work function.

Specifically, the gate of the transistor M21 is doped with p-type impurities and the gate of the transistor M22 is doped with n-type impurities, so that the transistor M21 has a higher threshold voltage than that of the transistor M22. Hence, the offset voltage Vo2 is obtained with the input transistor M21 having a positive gate potential relative to that of the input transistor M22.

The offset voltage Vo2 of the differential input circuit Sd2 thus obtained has a negative temperature coefficient, which is created by setting the size ratio of the transistor M21 to the transistor M22 to approximately 1:10.

As described above, the differential input circuit according to this patent specification has an offset voltage controlled by a difference in gate work function between a pair of input transistors, one with a P+ doped gate and the other with an N+ doped gate. The size ratio of the input transistors is adjusted so as to set the temperature coefficient of the offset voltage to zero or any appropriate value positive or negative.

Through effective use of the differential input circuit, the temperature sensing circuit 1 according to this patent specification achieves precise temperature detection with a simple and compact circuit configuration.

The temperature sensing circuit 1 may be used in any type of electronic equipment, such as voltage regulators, personal computers, and various types of portable devices and home appliances, where temperature sensing capability is required to perform a given function in response to detection of a given set-point temperature, such as switching of power and/or control signals.

Numerous additional modifications and variations of the present disclosure are possible in light of the above teachings. It is therefore to be understood that, within the scope of the appended claims, the disclosure of this patent specification may be practiced otherwise than as specifically described herein.

This patent specification is based on Japanese patent application No. JP-A-2007-233788 filed on Sep. 10, 2007 in the Japanese Patent Office, the entire contents of which are hereby incorporated by reference herein.

What is claimed is:

1. A temperature sensing circuit that detects a given temperature, the circuit comprising:
   an operational amplifier including a first differential input circuit located in an input stage of the operational amplifier, the first differential input circuit being configured to provide a first offset voltage with no temperature coefficient; and
   a comparator including a second differential input circuit located in an input stage of the comparator, the second differential input circuit being connected to the first differential input circuit and configured to provide a second offset voltage with a non-zero temperature coefficient,
   wherein the comparator has a first input connected to an output of the operational amplifier, and a second input connected to a ground potential, and the comparator compares the first offset voltage with the ground potential to output a detection signal upon detection of the given temperature.

2. The temperature sensing circuit according to claim 1, wherein
   the operational amplifier has a non-inverting input connected to the ground potential, and an inverting input and an output connected together to form a voltage follower.

3. The temperature sensing circuit according to claim 2, further comprising a voltage divider configured to divide the output of the operational amplifier prior to connection to the one input of the comparator.

4. The temperature sensing circuit according to claim 2, wherein the inverting input of the operational amplifier is fed a positive voltage relative to the ground potential to which the non-inverting input of the operational amplifier is connected.

5. The temperature sensing circuit according to claim 1, wherein
   the operational amplifier has a non-inverting input connected to the ground potential, and the operational amplifier is configured to multiply the first offset voltage by a given gain.

6. The temperature sensing circuit according to claim 1, wherein each of the first and second differential input circuits is formed by combining first and second transistors having different gate work functions.

7. The temperature sensing circuit according to claim 6, wherein the first transistor has a p-type doped gate and the second transistor has an n-type doped gate, and the temperature coefficient of each of the first and second differential circuits is adjusted by tuning a size ratio between the p-type doped gate and the n-type doped gate.

8. The temperature sensing circuit according to claim 1, wherein the first input of the comparator is fed a positive voltage relative to the ground potential to which the second input of the comparator is connected.

9. The temperature sensing circuit according to claim 1, wherein
   the second differential input circuit is formed by combining first and second transistors having different gate work functions, the first transistor having a p-type doped gate connected to the first input of the comparator, and the second transistor having an n-type doped gate connected to the second input of the comparator, and
   the temperature coefficient of the second differential circuit is based on a size ratio of the first transistor to the second transistor.

10. The temperature sensing circuit according to claim 9, wherein the size ratio of the first transistor to the second transistor is less than 1.

11. The temperature sensing circuit according to claim 9, wherein
    a relative voltage between the first and second inputs of the comparator is determined by a difference between a first threshold voltage of the first transistor and a second threshold voltage of the second transistor, and
    the first threshold voltage of the first transistor is higher than the second threshold voltage of the second transistor.

12. An electronic device comprising a temperature sensing circuit configured to detect a given temperature, the circuit including:
    an operational amplifier including a first differential input circuit located in an input stage of the operational amplifier, the first differential input circuit being configured to provide a first offset voltage with no temperature coefficient; and
    a comparator including a second differential input circuit located in an input stage of the comparator, the second differential input circuit being connected to the first differential input circuit and configured to provide a second offset voltage with a non-zero temperature coefficient,
    wherein the comparator has a first input connected to an output of the operational amplifier, and a second input connected to a ground potential, and the comparator compares the first offset voltage with the ground potential to output a detection signal upon detection of the given temperature.

13. The electronic device according to claim 12, wherein the electronic device is one of a voltage regulator, a personal computer, a portable device, and a home appliance.

14. A temperature sensing circuit that detects a given temperature, the circuit comprising:
    a comparator including a differential input circuit located in an input stage of the comparator, the differential input circuit being configured to provide an offset voltage with a non-zero temperature coefficient,
    wherein the comparator has a first input connected to an input voltage with no temperature coefficient, and a second input connected to a ground potential, and the comparator compares the input voltage against the ground potential to output a detection signal upon detection of the given temperature.

* * * * *